United States Patent [19]

Otte

[11] 4,416,048

[45] Nov. 22, 1983

[54] TOILET SEAT MOUNTING ARRANGEMENT

[75] Inventor: Timothy J. Otte, Sheboygan Falls, Wis.

[73] Assignee: Bemis Manufacturing Company, Sheboygan Falls, Wis.

[21] Appl. No.: 326,019

[22] Filed: Nov. 30, 1981

[51] Int. Cl.³ ............................................. B23P 19/00
[52] U.S. Cl. .................................... 29/526 R; 411/32; 411/50; 411/60
[58] Field of Search ................. 4/236, 240; 29/526 R; 411/31, 32, 15, 50, 51, 60

[56] References Cited

U.S. PATENT DOCUMENTS 3,551,922 1/1971 Watson ..................................... 4/236
4,319,365 3/1982 Bemis et al. ............................. 4/236

Primary Examiner—Mark Rosenbaum
Assistant Examiner—Steven Nichols
Attorney, Agent, or Firm—Dressler, Goldsmith, Shore, Sutker & Milnamow, Ltd.

[57] ABSTRACT

A mounting arrangement for attaching a toilet seat and cover to a toilet bowl is disclosed which facilitates installation without the use of conventional hand tools. The arrangement includes a base having a hinge post for hingedly connecting the seat and cover thereto. The base further includes a downwardly depending stem having a longitudinal bore which is adapted to be positioned within the mounting hole on the toilet bowl. A fastener assembly is provided which includes a bolt positioned within the longitudinal bore of the stem which may be readily rotated by hand. An expandable nut is threaded to the lower end of the bolt, with the entire mounting arrangement being insertable into the mounting hole of the bowl from the seat side thereof. As the bolt is rotated to draw the nut toward the base of the arrangement, at least one of the stem and expandable nut are urged into engagement with the periphery of the mounting hole, thereby providing securement of the mounting arrangement to the toilet bowl, while accommodating use of the mounting arrangement on toilet bowls having mounting holes of varying diameters.

14 Claims, 5 Drawing Figures

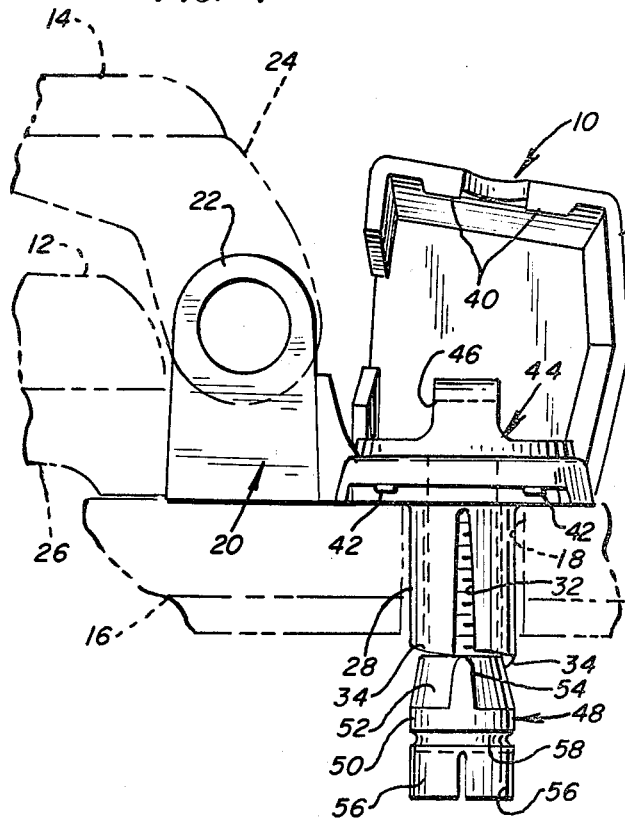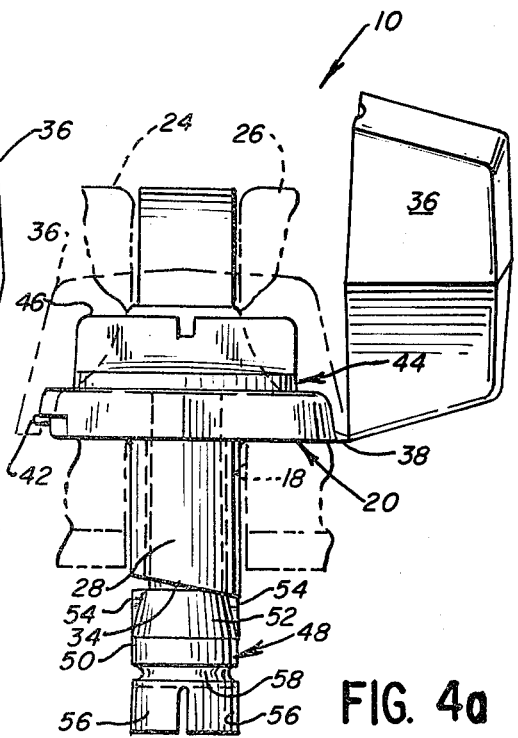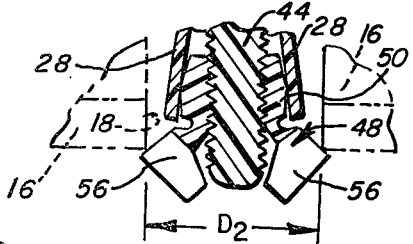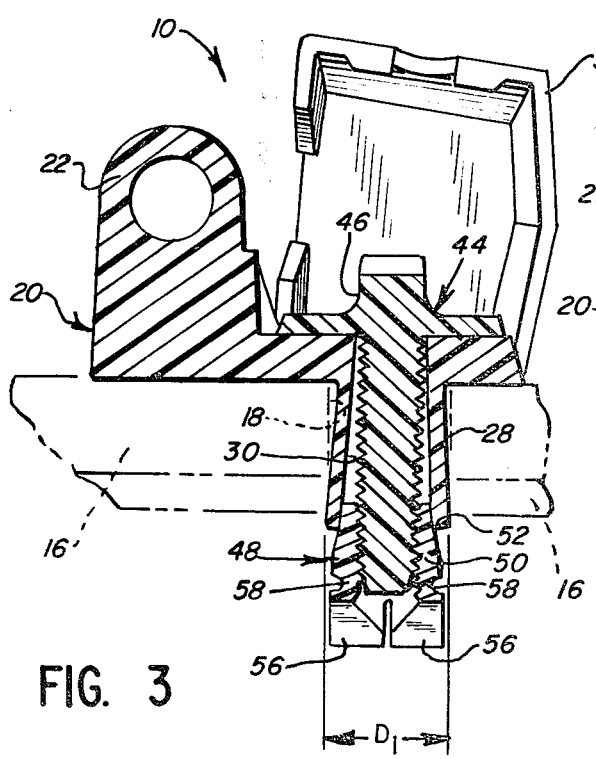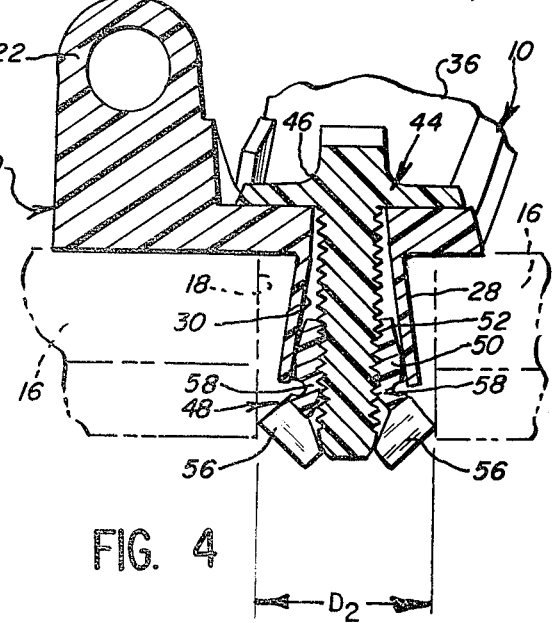

TOILET SEAT MOUNTING ARRANGEMENT

TECHNICAL FIELD

The present invention relates generally to arrangements for attaching fixtures to a mounting surface, and more particularly to an arrangement for hingedly connecting a toilet seat and cover to a toilet bowl.

BACKGROUND OF THE INVENTION

Mounting of a toilet seat and cover to a toilet bowl can be a difficult task when the bowl is located near a wall or cabinet, or in an otherwise cramped location. The location of the toilet bowl may render it practically impossible to position tools beneath the toilet bowl for tightening hardware used to affix the toilet seat and cover thereto. Further, since the mounting of the toilet seat and cover may tend to loosen somewhat over a period of time, similar problems are experienced in retightening the assembly.

A further problem sometimes encountered in mounting a toilet seat to the bowl results from the lack of uniformity in the size of holes provided in bowls for mounting seats. Although a mounting arrangement may be suited for one range of hole sizes, the arrangement may be unsuited for use for mounting in holes which fall outside that range.

For example, commonly assigned co-pending application Ser. No. 120,133, filed Feb. 11, 1980, illustrates a toilet seat mounting arrangement operable from the seat side of the bowl. While this arrangement may be effectively fitted to a mounting hole within a certain size range, adapting it for mounting in a hole having a size beyond this range may require attachment of a relatively larger nut to the bolt of the fastener assembly. Naturally, this detracts somewhat from the versatility of the arrangement, requiring that a larger variety of hardware be made available to provide for mounting toilet seats to bowls having mounting holes of diverse diameters.

SUMMARY OF THE INVENTION

In accordance with the present invention, a mounting arrangement is disclosed for mounting a toilet seat and cover to a toilet bowl. It will be appreciated that the mounting arrangement of the present invention would be equally suited for attaching a fixture to a wall or other suitable mounting surface in a like fashion.

The mounting arrangement includes a mounting base adapted to be supported upon and abut the toilet bowl. The base includes an upper portion which defines an integral hinge post for hingedly mounting the toilet seat and cover to the base. The base further includes an integral stem having a longitudinal bore, the stem being adapted to be disposed within the seat mounting hole defined by the toilet bowl.

In order to securely affix the base to the toilet bowl, the mounting arrangement further includes a removable fastener assembly. The fastener assembly includes a bolt disposed within the bore of the stem, and an expandable nut threaded onto the bolt. Significantly, the fastener assembly is dimensioned such that it may be inserted as a unit together with the base through the mounting hole in the toilet bowl, thus obviating the need to thread the nut onto the bolt after the mounting base is in position on the bowl. The bolt includes a head portion which may easily be gripped by hand or by a suitable tool for rotation of the bolt.

The expandable nut of the fastener assembly includes an inwardly tapered upper portion, and a plurality of expandable portions hingedly connected to the upper portion. As the nut is advanced along the shank of the bolt, the end of shank engages the expandable portions of the nut, thereby urging them outwardly toward engagement with the periphery of the mounting hole within which the mounting arrangement is disposed. Expansion of the nut in this fashion provides for securement of the mounting arrangement to a toilet bowl where the mounting hole defined thereby is relatively large.

The mounting arrangement further includes expansion means which permit securement of the mounting arrangement to a toilet bowl having a mounting hole of a relatively smaller diameter. The expansion means include a longitudinal slit defined by the stem of the mounting base. As the expandable nut of the fastener assembly is drawn toward the mounting base by rotation of the bolt relative thereto, the tapered upper portion of the nut engages the stem of the base thereby urging it outwardly toward engagement with the periphery of the mounting hole. Expansion of the stem in this fashion adds to the versatility of the mounting arrangement so that it is suited for use on toilet bowls defining mounting holes of varying diameters. Significantly, the entire arrangement may be put in place and tightened from the seat side of the toilet bowl so that the entire procedure may be accomplished in a simple and straightforward manner. Similarly, removal of the arrangement is possible by loosening the fastener assembly, with the nut remaining on the bolt so the mounting arrangement may be removed as a unit.

Numerous other advantages and features of the present invention will become readily apparent from the following detailed description of the invention and accompanying drawings in which like numerals are employed to designate like parts throughout the same.

BRIEF DESCRIPTION OF THE DRAWINGS

FIG. 1 is a side elevational view of the mounting arrangement of the present invention;

FIG. 2 is a back elevational view of the mounting arrangement of FIG. 1;

FIG. 3 is a view similar to FIG. 1 in cross-section illustrating the mounting arrangement disposed within a relatively small mounting hole;

FIG. 4 is a view similar to FIG. 3 illustrating the mounting arrangement disposed within a relatively large mounting hole; and FIG. 4a is a partial view similar to FIG. 4 further illustrating the present mounting arrangement.

DESCRIPTION OF THE PREFERRED EMBODIMENT

While the present invention is susceptible to embodiment in different forms, there is shown in the drawings and hereinafter described a presently preferred embodiment with the understanding that the present disclosure is to be considered as an exemplification of the invention and is not intended to limit the invention to the specific embodiment illustrated.

With reference now to the figures, therein is illustrated the mounting arrangement 10 (typically one of two) for mounting a toilet seat 12 and a seat cover 14 to a toilet bowl 16 defining a mounting hole 18 (all shown in phantom). The mounting arrangement includes a mounting base 20, preferably fabricated as one piece from plastic such as polypropylene or high-density polyethylene, or other similar non-corrosive material exhibiting suitable resiliency to prevent scratching or marring of the toilet bowl. Mounting base 20 includes a first upper portion 22 which defines an integral hinge post. A cover bracket 24 and a seat bracket 26 (shown in phantom) are respectively attached to seat cover 14 and toilet seat 12, brackets 24 and 26 being hingedly carried by hinge post 22 on opposite sides thereof for movement of seat 12 and cover 14 relative to toilet bowl 16.

Mounting base 20 further includes an integral stem 28 which is positionable within hole 18 in the bowl. Stem 28 defines an internal bore 30 and a pair of diametrically opposed longitudinal slits 32. The lower end of stem 28 includes inclined surfaces 34, the function of which is described hereinafter.

So that mounting arrangement 10 is provided with an aesthetically pleasing appearance when in position, a cover 36 is hingedly connected to mounting base 20 by integral hinge 38 for movement between an open position and a closed position (shown in phantom in FIG. 2). Cover 36 is releasably maintained in the closed position by cooperation of integral lock tabs 40 on the cover with integral lock lugs 42 provided on mounting base 20. Tabs 40 and lugs 42 cooperate with a snap-like action so cover 36 may be easily opened and closed as desired.

In order to firmly affix mounting base 20 to toilet bowl 16, mounting arrangement 10 further includes a unique fastener assembly. The fastener assembly includes a threaded bolt 44 which extends within the longitudinal bore 30 of stem 28. Bolt 44 is preferably fabricated from durable, non-corrosive material, such as nylon. Bolt 44 includes a head portion 46 which may be easily manipulated either by hand or by a suitable tool. As shown, head portion 46 of bolt 44 is completely covered and hidden by cover 36 when it is in the closed position to provide a pleasing appearance for the mounting arrangement.

The fastener assembly of the mounting arrangement further includes an expandable nut 48 threaded to the shank of bolt 44. Nut 48 is preferably fabricated from a durable, non-corrosive material which exhibits suitable resiliency, such as polypropylene.

Expandable nut 48 includes a threaded upper portion 50 having an inwardly tapered surface 52. As will be further described, surface 52 cooperates with stem 28 of the mounting base as nut 48 is advanced upwardly of bolt 44 to urge the stem toward engagement with the periphery of mounting hole 18.

To facilitate adjustment of mounting arrangement 10 from the seat side of toilet bowl 16 only, nut 48 includes outwardly projecting tabs 54 which cooperate with the inclined surfaces 34 of stem 28 to prevent relative rotation of nut 48 and stem 28. Specifically, as bolt 44 is rotated so as to draw nut 48 upwardly thereof, tabs 54 engage inclined surfaces 34 and are guided toward longitudinal slits 32 in the stem. This results in an indexing action which aligns tabs 54 with slits 32, and thus prevents further relative rotation of the nut to the stem 28. As nut 48 is further drawn along bolt 44, each tab 54 moves within a respective slit 32.

As shown, expandable nut 48 is "split" to define a plurality of expansion portions 56 hingedly connected with threaded upper portion 50 by hinge portion 58, suitably formed by a portion of the nut having a reduced diameter. The resiliency of the material of which nut 48 is preferably formed provides hinge portion 58 as a "living hinge" which may be used repeatedly without permanent deformation.

In the preferred embodiment, four expansion portions 56 are provided, each subscribing approximately 90 degrees. While this configuration has proved suitable, it will be appreciated that the number of expansion portions 56 provided for nut 48 is a matter of design choice.

As best shown in FIGS. 3, 4, and 4a, the adaptability of mounting arrangement 10 for use in mounting the toilet seat and cover to toilet bowls having the mounting holes of varying diameters is illustrated. As shown in FIG. 3, mounting hole 18 has a diameter $D_1$, which corresponds to the diameter of the hole as illustrated in FIGS. 1 and 2. It should be appreciated that the configuration of mounting arrangement 10 is such that bolt 44 may be inserted into stem 28 and nut 48 partially threaded thereon until tabs 54 engage slits 32, and the entire arrangement inserted into hole 18 as a preassembly. The fastener assembly is dimensioned such that tabs 54 engage slit 32 before the end of the shank on bolt 44 engages expansion positions 56 of nut 48, so that nut would appear generally as in FIGS. 1 and 2.

In order to secure the mounting arrangement to the toilet bowl, head portion 46 of bolt 44 is manipulated to rotate the bolt so that nut 44 advances upwardly thereof. During tightening in this fashion, tabs 54 on nut 48 are indexed in alignment with longitudinal slits 32 so relative rotation of nut 44 with respect to stem 28 is prevented.

As bolt 44 is further rotated so that nut 48 moves toward mounting base 20, the tapered surface 52 of upper nut portion 50 engages and cooperates with stem 28 to urge the stem outwardly toward engagement with the periphery of mounting hole 18. This action is clearly illustrated in FIG. 3. Upon further tightening of bolt 44, nut 48 is tightly wedged between the bolt and stem 28, thereby providing secure engagement of stem 28 with the periphery of mounting hole 18 so that mounting base 20 is firmly secured to toilet bowl 16. It will be appreciated that use of mounting arrangement 10 on a bowl having mounting hole 18 of a relatively smaller diameter $D_1$ does not require expansion of expandable nut 48 for securement of the mounting arrangement to the bowl.

If it is now assumed that mounting hole 18 is of a relatively larger diameter, $D_2$, FIG. 4 clearly illustrates that the lack of engagement of stem 28 with the periphery of mounting hole 18 precludes securement of mounting base 20 to toilet bowl 16 as in FIG. 3. However, this does not affect the suitability of mounting arrangement 10 for use on bowl 16 having a mounting hole of a relatively larger diameter.

Mounting arrangement 10 is first preassembled as described so that bolt 44 extends within longitudinal bore 30 of stem 28, and nut 48 is partially threaded onto the shank of the bolt. The arrangement would appear generally as shown in FIG. 1 after mounting in hole 18, but before tightening of bolt 44 and nut 48.

As bolt 44 is rotated by head portion 46 in a direction to draw nut 48 toward mounting base 20, relative rotation of the nut with respect to the stem 28 is prevented by the disposition of tabs 54 on the nut in longitudinal slits 32.

As bolt 44 is further rotated, nut 48 is drawn upwardly so that its upper portion 50 engages stem 28, urging the stem toward engagement with the periphery of mounting hole 18. As shown in FIG. 4, it will be seen that even though stem 28 is expanded in this fashion, the diameter D₂ of hole 18 precludes engagement of stem 28 with the periphery of the hole.

As nut 48 advances upwardly of bolt 44 by relative rotation thereof, the lower end of the shank of bolt 44 engages each of expansion portions 56 of the nut 48. As this occurs, each portion 56 resiliently hinges about hinge portion 58 so that the effective diameter of nut 48 is increased significantly, and each portion 56 is urged toward engagement with the periphery of mounting hole 18 inwardly of the ends of the hole. The end of bolt 44 and the bolt-engaging surfaces of expansion portions 56 are preferably angled slightly to provide for smooth expansion of the nut.

As each portion 56 engages the periphery of mounting hole, further rotation of bolt 44 firmly tightens the fastener assembly so that mounting base 20 is securely held in abutting relation to toilet bowl 16. After this is complete, cover 36 may be moved to its closed position, and brackets 24 and 26 mounted to upper portion 22 of mounting base 20 which defines the hinge post. After a similar mounting arrangement 10 is affixed in a like fashion to toilet bowl 16 by insertion into a second mounting hole, and brackets attached to its hinge post, toilet seat 12 and seat cover 14 may be attached to the brackets so that installation of the toilet seat and cover is completed.

FIG. 4A illustrates attachment of mounting arrangement 10 to bowl 16 which defines mounting hole 18' having a diameter D₂. This figure differs from FIG. 4 in that the depth of hole 18' is shown as relatively less than hole 18 in FIG. 4 (i.e. the mounting surface of bowl 16 is less thick). It will be appreciated that the suitability of the mounting arrangement is not affected by this variation in the hold dimension. After the mounting arrangement is assembled and put in place as described, tightening of bolt 44 results in engagement of expansion portions 56 of nut 48 with the periphery of hole 18' at one end thereof, as shown, so that the arrangement is firmly maintained in place. This further enhances the versatility of the mounting arrangement in that it is adapted for use in mounting holes of varying depth, with nut 48 engageable with the periphery of the hole intermediate its ends (as in FIG. 4) or at one end of the hole (as in FIG. 4a).

Thus, it will be appreciated that the mounting arrangement of the present invention is highly versatile in that it may be used for mounting a toilet seat and cover to toilet bowls having mounting holes of varying dimensions. Operation of bolt 44 to move nut 48 therealong toward mounting base 20 results in at least one of stem 28 and nut 48 engaging the periphery of the mounting hole whereby the arrangement is firmly secured to the toilet bowl. Additionally, if the toilet seat must be removed from the toilet bowl, bolt 44 can be loosened and the mounting arrangement removed as a unit with nut 48 remaining on the bolt. Again, this may be easily accomplished from the seat side of the bowl only.

From the foregoing, it will be observed that numerous variations and modifications may be effected without departing from the true spirit and scope of the novel concept of the present invention. It will be understood that no limitation with respect to the specific apparatus illustrated herein is intended or should be inferred. It is, of course, intended to cover by the appended claims all such modifications as fall within the scope of the claims.

What is claimed is:

1. An arrangement for attaching a toilet seat to a toilet bowl, said bowl defining at least one mounting hole, comprising:
   a base adapted to be supported upon said bowl, the upper portion of said base having an integral hinge post for hingedly mounting said seat to said base, and the lower portion of said base including a stem having a longitudinal bore, said stem being disposed in said mounting hole, and
   removable fastener means including a bolt disposed within said bore and expandable nut means threaded on said bolt so that the arrangement is insertable into said hole, and said bolt operates from the seat side of said bowl to expand said nut means toward engagement with the periphery of said mounting hole for securely maintaining said arrangement affixed to said seat thereby providing a secure hinge mounting for said seat.

2. An arrangement for attaching a toilet seat in accordance with claim 1, and
   means for preventing relative rotation of said nut means and said stem during expansion of said nut means.

3. An arrangement for attaching a toilet seat in accordance with claim 2, wherein
   said preventing means comprise a tab portion on said nut means engageable with said stem.

4. An arrangement for attaching a toilet seat in accordance with claim 3, and
   expansion means whereby movement of said nut means upwardly of said stem urges said stem toward engagement with the periphery of said hole.

5. An arrangement for attaching a toilet seat in accordance with claim 4, wherein
   said expansion means comprise a longitudinal slit defined by said stem within which said tab portion is movable.

6. An arrangement for attaching a toilet seat in accordance with claim 5, wherein
   said expansion means further include an upwardly tapered portion of said nut means engageable with said stem.

7. An arrangement for attaching a toilet seat in accordance with claim 1 or 6, wherein
   said nut means includes a nut having a lower portion including a plurality of expansion portions each hingedly connected to the upper portion of said nut for movement outwardly thereof when said bolt is threaded into said nut and engages said expansion portions.

8. An arrangement for attaching a fixture to a mounting surface defining a hole, comprising:
   a base including a first portion to which said fixture is mountable, and a second portion adapted to abut said surface and including a stem having a longitudinal bore disposed in said hole,
   removable fastener means including a bolt disposed within said bore and expandable nut means threaded on said bolt, said bolt being operable from the side of said surface against which said base abuts to expand said nut toward engagement with the periphery of said hole, and
   expansion means whereby movement of said nut means toward said base urges said stem toward engagement with the periphery of said hole, whereby operation of said bolt to move said nut means therealong toward said base results in at least one of said stem and nut means engaging the periphery of said hole for securing said arrangement to said wall.

9. An arrangement for attaching a fixture in accordance with claim 8, wherein
said expansion means comprises a longitudinal slit defined by said stem, and an upwardly tapered portion of said nut means engageable with said stem.

10. An arrangement for attaching a fixture in accordance with claim 8 or 9, wherein
said expandable nut means comprise a nut having a plurality of hinged expansion portions movable outwardly of said bolt upon engagement therewith.

11. An arrangement for attaching a fixture in accordance with claim 10, and
means adapted to prevent relative rotation of said nut means and stem comprising a tab on said nut means engageable with said stem.

12. A method of attaching a toilet seat to a toilet bowl defining a mounting hole comprising the steps of:
assembling a mounting base having an integral stem defining a longitudinal bore and having an integral hinge post, with a fastener assembly including a bolt positionable within said bore and an expandable nut threadable on said bolt,
positioning said base in abutting relation with said bowl so that said stem is disposed within said mounting hole, and
tightening said fastener assembly by rotation of said bolt to draw said nut along said bolt toward said base so that at least one of said stem and expandable nut engage the periphery of said mounting hole to firmly secure the base to the bowl so the toilet seat may be attached to said hinge post.

13. A method of attaching a toilet seat in accordance with claim 12, wherein
said stem defines at least one longitudinal slit, and said expandable nut includes an upper inwardly tapered portion engageable with said stem for urging said stem toward engagement with the periphery of said hole when said fastener assembly is tightened.

14. A method of attaching a toilet seat in accordance with claim 12 or 13, wherein
said expandable nut include a plurality of expansion portions engageable with said bolt, engagement of said bolt with said expansion portions during tightening of said fastener assembly urging said expansion portions toward engagement with the periphery of said mounting hole.

* * * * *